United States Patent [19]

Galand et al.

[11] Patent Number: 4,751,730
[45] Date of Patent: Jun. 14, 1988

[54] PROCESS AND SYSTEM FOR IMPROVING ECHO CANCELLATION WITHIN A TRANSMISSION NETWORK

[75] Inventors: Claude Galand, Cagnes sur Mer, France; Guy Platel, Durham, N.C.

[73] Assignee: International Business Machines Corp., Armonk, N.Y.

[21] Appl. No.: 856,265

[22] Filed: Apr. 28, 1986

[30] Foreign Application Priority Data

Apr. 30, 1985 [EP] European Pat. Off. ........ 0844300483
Apr. 30, 1985 [EP] European Pat. Off. ........ 85430015.9

[51] Int. Cl.$^4$ .............................................. H04B 3/23
[52] U.S. Cl. .................................... 379/410; 370/32.1
[58] Field of Search ............... 379/410, 411, 406, 407; 370/32, 32.1

[56] References Cited

U.S. PATENT DOCUMENTS

| | | | |
|---|---|---|---|
| 3,721,777 | 3/1973 | Thomas | 379/410 |
| 3,754,105 | 8/1973 | Poschenrieder et al. | 379/409 |
| 4,005,277 | 1/1977 | Araseki et al. | 379/406 |
| 4,282,411 | 8/1981 | Stewart | 379/406 |
| 4,360,712 | 11/1982 | Horna | 379/410 X |
| 4,467,146 | 8/1984 | Lassaux | 379/407 X |
| 4,527,020 | 7/1985 | Ito | 379/410 |
| 4,546,216 | 10/1985 | Tegethoff | 379/406 X |

*Primary Examiner*—Jin F. Ng
*Assistant Examiner*—Randall S. Vaas
*Attorney, Agent, or Firm*—John B. Frisone

[57] ABSTRACT

This process enables cancelling residual echo signals in a transmission system wherein echo signals are partially cancelled through use of a filter generating an echo replica, and substracting said replica from the signal in the echo path. The process involves measuring energies of incoming and outgoing signals, comparing the ratio of said energies to a predetermined threshold value to generate a flag information, which flag is used to control a switch on the echo path. The threshold is determined, for instance by using the information provided by the echo path impulse response not considered for the generation of the echo replica.

4 Claims, 3 Drawing Sheets

PROCESS AND SYSTEM FOR IMPROVING ECHO CANCELLATION WITHIN A TRANSMISSION NETWORK

This invention deals with transmission techniques, and more particularly with a process and system for improving echo cancellation in a voice transmission network.

In most cases, a phone conversation is transmitted partly over a bidirectional 2-wire line and partly over a pair of unidirectional 2-wire lines. The junctions between the two types of lines are implemented by hybrid transformers. Since the hybrid transformers are balanced for an averaged line impedance, they do not perfectly separate the two unidirectional paths from each other, and therefore they create echo signals. For local calls, these echoes do not disturb the conversation. However, if a delay is introduced in the four-wire path, for example for satellite transmission or for digital encoding, the echoes must be canceled to ensure better speech quality.

Usually, echoes are canceled with means designed to analyze the signal of one of the unidirectional paths to reproduce dynamically a replica of the echo signal which is then subtracted from the unprocessed signal on the other unidirectional path. As a general rule, the greater the distance traveled by the echo, the longer the duration of the signal to be analyzed should be. Finite impulse response (FIR) digital filters are often used to approximate the hybrid transfer function, and thus help synthesizing the replica. The filter coefficients are adapted by using a gradient method to determine the cross-correlation of the outgoing signal and of the incoming signal after echo cancellation. Since typical echo paths can be as long as 32 ms, the filter delay line should have 256 taps, assuming a 8 kHz sampling rate. A large processing power should therefore be necessary to implement the echo canceler.

In practice, the replica generated is generally only an approximation of the echo itself for several reasons. For instance even assuming an infinitely long digital filter is used, the filter precision is closely related to the precision of the digital encoding of the filter coefficients. Also as mentioned above, limited length filters (FIR) are generally used in practice for obvious economic reasons. This again increases the discrepancies between the echo itself and its reconstructed replica. As disclosed below, the FIR may also be associated with a flat delay to limit the required filtering computing power, and assign it to the most significant portion of the filtering means.

As proposed in U.S. Pat. No. 6,593,161 one can generally approximate the echo path by a flat delay followed by a short impulse response. Once the flat delay has been determined, the hybrid impulse response can be approximated with a 16 to 48-tap FIR filter, which substantially reduces the processing load required for echo cancellation. For the accurate determination of the flat delay, a fast start-up procedure is used, which is based on a training sequence. As a result, the flat delay is evaluated and the coefficients of the echo canceler filter are initialized at the beginning of the conversation in less than 200 ms. Then, the standard gradient updating method is used during the remaining conversation to prevent sudden variations of the hybrid balancing during the conversation. In fact, using a short FIR filter reduces the processing load but introduces some residual echo. In most cases, this residual echo may be acoustically acceptable, but cannot be tolerated as far as the transmission of echo packets increases the traffic and the freeze-out probabilities in the network.

BRIEF DESCRIPTION OF THE INVENTION

This invention provides for a residual echo clipping process which makes use of an accurate determination of a decision threshold in order to efficiently eliminate residual echo without any impact on the voice quality.

DETAILED DESCRIPTION OF THE INVENTION

Figure 1:
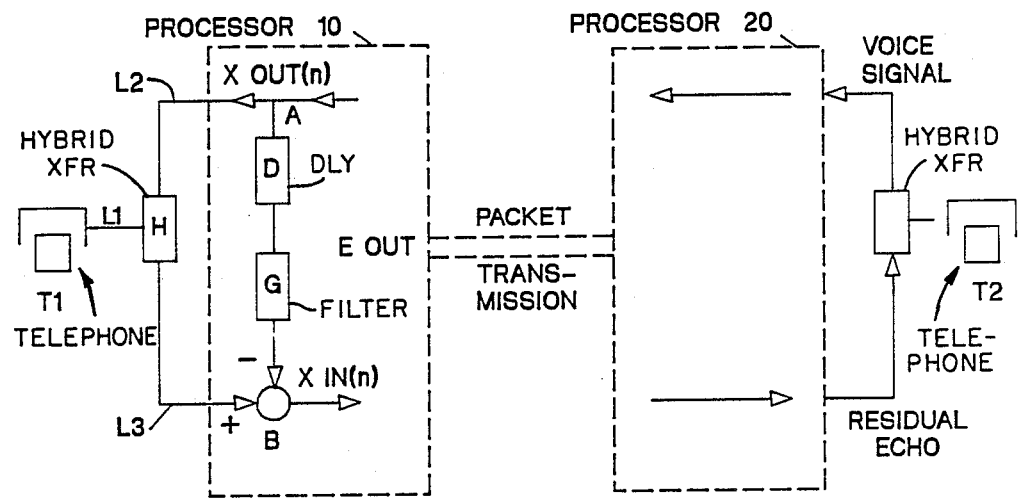
FIG. 1 shows a schematic representation of a transmission system including an echo canceler.

FIG. 1 represents the implementation of an echo canceler in a 2 to 4 wire circuit. As stated above, this implementation is based on the use of a shortened echo canceler filter G coupled to a flat delay D. More particularly FIG. 1 shows a schematic representation of a portion of a voice transmission network for connecting a near-end telephone set T1 to another telephone set T2 (far-end telephone set). The path between T1 and T2 is partly over a two-wire bidirectional line L1 and partly over a four-wire line, i.e. two unidirectional lines L2 and L3, with an hybrid transformer H in between. In addition one should note that the network involves both analog and digital transmission techniques. For instance analog transmission is performed over both end circuits, i.e. the circuit between T1 and a first processor 10 and the circuit between T2 and a second processor 20. The link between the two processors is a digital link over which transmission is performed using packet transmission techniques. Analog to digital, and vice versa conversions are performed within the two processors using conventional techniques. Also within the same processors are performed echo cancellation operations.

The echo canceler is a linear filter that recreates the echo path channel from point A through hybrid transformer H, and to point B, to subtract the estimated echo signal from the near-end signal generated by T1. The taps of this filter are up-dated by a gradient method. For additional information one might refer for instance to the above cited patent.

The time span over which the response differs significantly from zero is generally about 2 to 6 ms (16 to 48 taps, assuming a 8 kHz sampling rate). Because of the flat delay in the transmission path from the echo canceler to the hybrid, the non zero region for the impulse response does not begin at the time origin, but is delayed. So, the echo canceler (which recreates the end path channel) is a pure delay D, followed by a short filter G.

If $X_{out}(n)$ denotes the far-end speaker signal that enters the echo canceler, and $X_{in}(n)$ the residual echo signal that comes out, we have:

$$X_{in} = X_{out} * (H - GD) \tag{1}$$

where * denotes the convolution operator, H represents the impulse response of the hybrid H, and GD represents the impulse response of the echo canceler G delayed by D.

Figure 2:
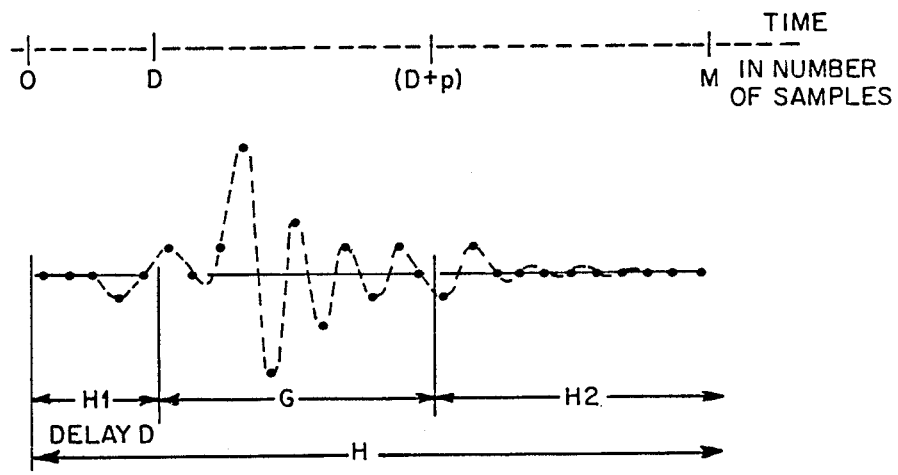
FIG. 2 represents the impulse response of the hybrid transformer included in the system of FIG. 1.

FIG. 2 graphically shows the hybrid impulse response H, whose time representation has been split into three parts (H1, G, and H2). G represents the approximated impulse response which is actually compensated for by the echo canceler once the initialization is completed. H1 represents the impulse response approximated by the flat delay D. (H1+H2) represents the neglected impulse response, i.e. the portion of the hybrid impulse response which is not compensated for by the echo canceler.

Figure 3:
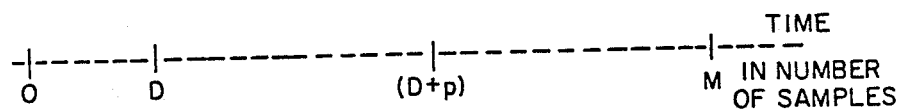
FIG. 3 represents a residual impulse response.
Figure 3:
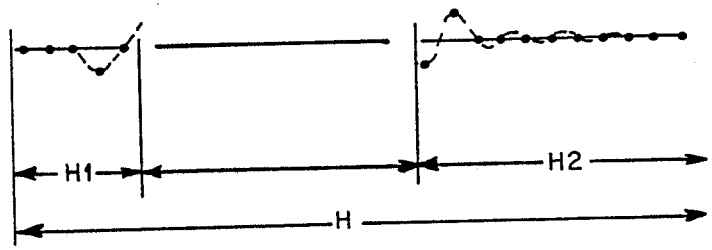

For the accurate determination of the flat delay D, the fast start-up procedure is based on the use of a training sequence as disclosed in the above mentioned patent. The flat delay D is evaluated and the p coefficients of the echo canceler filter G are initialized at the beginning of the conversation. However, the net result of this imperfect cancellation is that a portion of the echo signal is retransmitted to the far-end extension. This echo signal is in fact the result of the convolution product of the far-end signal Xout(n) by the filter the impulse response of which would be (H1+H2). This imperfect cancelation is graphically shown on FIG. 3: Obviously (H1+H2) also includes a flat delay in between, said delay being as long as the echo replica filter G.

Assuming H12(n) denotes the residual hybrid impulse response for the nth sampling instant, which residual corresponds to the H1 and H2 portions of H(n), i.e. H12=H1+H2, then the residual echo signal would be given by:

$$Xin = Xout * H12 \quad (2)$$

The proposed improvement will enable evaluating the level of the residual echo signal and subsequently applying an optimal clipping of the near-end signal before transmission, to eliminate this echo without speech clipping of eventual local speech.

Figure 4:
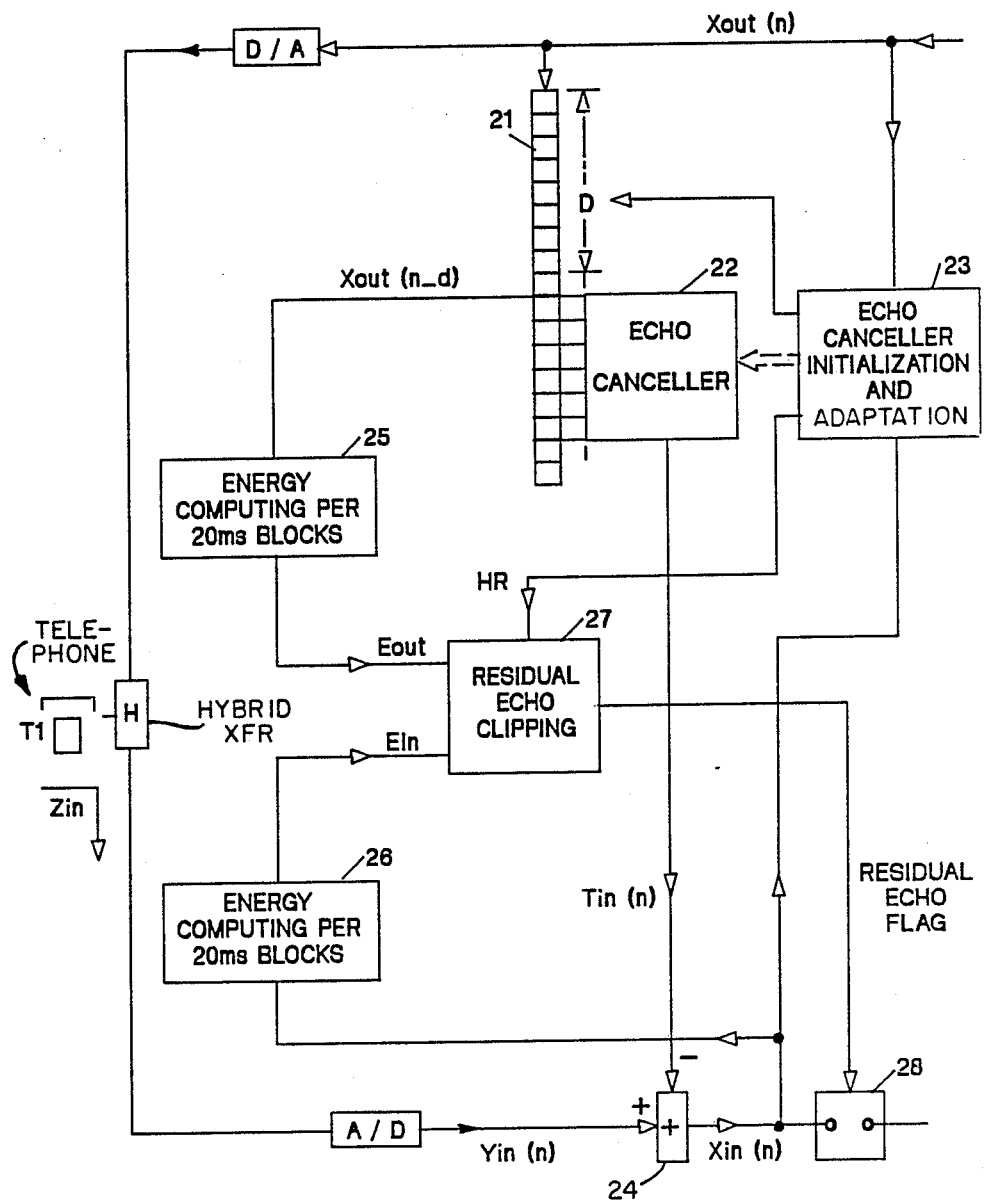
FIG. 4 is a schematic representation of the invention.

FIG. 4 represents the block diagram of the proposed system involved in implementing the process of this invention.

The echo canceler basically operates as follows. The far-end signal Xout(n) at the input of digital to analog converting means (D/A), is sent through a delay line (21) to an echo canceler estimator (22). The taps initialization and updating are performed in device (23) according to the method described in the above mentioned patent. The estimated echo signal Tin(n), i.e. the nth sample of the echo replica, is then subtracted in 24 from the near-end signal Yin(n) at the output of analog to digital converting means (A/D).

The proposed improvement is carried out through building blocks 25, 26, 27 and 28. A first energy information, the energy of the far-end signal Xout(n−D), i.e. Xout(n) delayed by the flat delay D, is computed for each block of samples 20 ms long in device 25, resulting in a sequence Eout(k), where k represents the block index.

$$Eout = \sum_{n=1}^{N} Xout(n - D)^2 \quad (3)$$

where the SUM is extended over the packet length N. In our case, N=160, corresponding to 20 ms blocks.

Similarly, a second energy information, the energy of the the near-end signal after echo cancellation, Xin(n) is computed for each block of 20 ms in device (26) resulting in a sequence Ein(k).

$$Ein = \sum_{n=1}^{N} Xin(n)^2 \quad (4)$$

Let Zin(n) denote the eventual local speaker signal see (FIG. 4). Then the received signal Yin(n) is equal to the sum of Zin(n) and the echo signal H*Xout(n):

$$Yin(n) = Zin(n) + (H*Xout(n-D)) \quad (5)$$

Since the echo canceler is supposed to approximate the second term of the right portion of this last relation, the signal after echo cancellation can be written as:

$$Xin(n) = Yin(n) - Tin(n) \quad (6)$$

where Tin(n) is the echo signal approximation:

$$Tin(n) = G*Xout(n-D) \quad (7)$$

Combining (5), (6) and (7) gives:

$$Xin(n) = (H12*Xout(n-D)) + Zin(n) \quad (8)$$

So the signal Xin(n) after echo cancellation is equal to the sum of the residual echo signal and the local speech signal.

Let's now compute the energy of each term in relation (8). Since signals Zin(n) and Xout(n) corresponding to the near-end speaker and to the far-end speaker are decorrelated, we can write:

$$Ein = ER + SP \quad (9)$$

where ER denotes the energy of the residual echo and SP the energy of the near-end signal Zin(n):

$$ER = \sum_{n=1}^{N} (H12 * Xout)(n - D)^2 \quad (10)$$

$$SP = \sum_{n=1}^{N} Zin(n)^2 \quad (11)$$

Equation (10) can be written:

$$ER = Eout \cdot HR \quad (12)$$

with:

$$HR = \sum_{i=1}^{D} H(i)^2 + \sum_{i=D+p}^{M} H(i)^2 \quad (13)$$

if H12 or Eout has a flat spectrum, otherwise $$ER < Eout \cdot MHR \quad (12')$$

with $$MHR = \underset{F}{MAX} \left| SUM_n H12(n) \, e^{-2j\pi fnT} \right|^2 \quad (13')$$

with T=sampling period (⅛ KHz)

Thus MHR represents the maximum of the power spectrum of H12. It should be noted that if the spectrum of H12 is flat then, $$MHR = HR.$$

Thus if $ER > Eout \cdot MHR$, then one could be sure that ER is not pure echo but contains near end speaker signal.

D, p, and M respectively represent the flat delay, the echo canceler order, and the actual hybrid filter order. In practice, M is less than 20 ms. In operation, the H(i) values are derived by the echo canceler initialization and adaptation means (23) as are the filter coefficient values, as disclosed in the above mentioned patent.

So one can determine if the current packet is purely an echo packet (which must not be transmitted), or if it contains near-end speaker signal.

In the first case (Ein=ER) no near end speaker energy (ER) is about equal to Eout·HR.

In the second case (Ein=ER+SP) residual echo plus near end speaker energy (ER+SP) is much greater than Eout·HR.

So the decision is taken on the following principle, the packet is transmitted only if:

$$Ein/Eout > THRESHOLD \qquad (14)$$

with $$THRESHOLD = ALPHA \cdot HR$$

in which ALPHA is a security margin, which takes into account the approximation of MHR by HR to minimize the processing, the imperfect convergence of the gradient and the non-linearities of the echo path channel (coder-decoder, etc . . . ). In our implementation, we have taken ALPHA=6 dB.

In practice, the residual echo clipping operation is performed by comparing Ein/Eout to the predetermined threshold level and generating a residual echo flag bit whenever Ein/Eout is less than the threshold. Said flag bit is then used to stop sending the entire considered packet of bits to the digital network.

Figure 5:
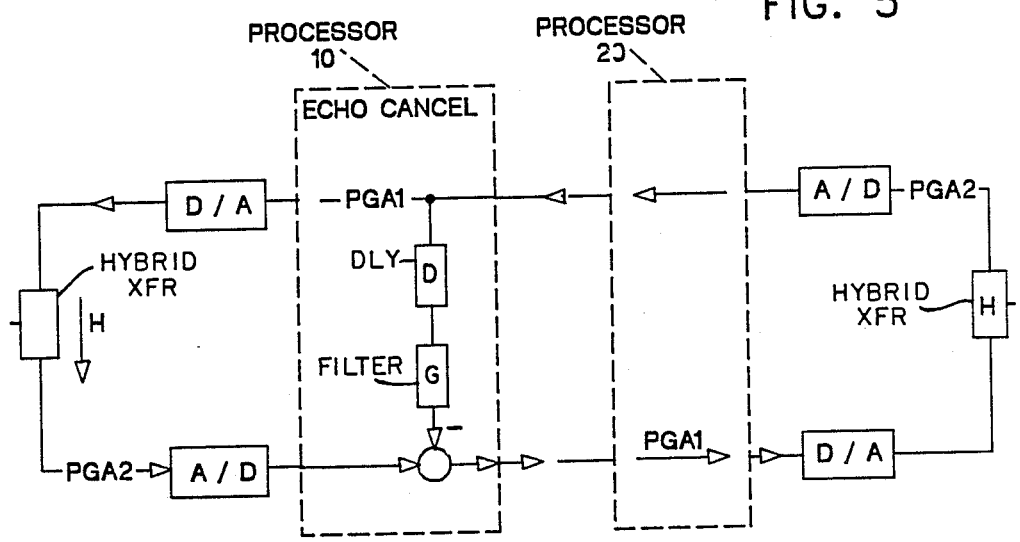
FIG. 5 illustrates a more specific application of this invention.

In operation, the echo path characteristics may change during the conversation. For example, if a programmable gain amplifier (PGA2) is inserted in front of the A/D converter (see FIG. 5), and if the PGA gain is updated during the conversation, the residual echo clipping threshold must be updated accordingly. The gain PGA2 is locally determined to make sure that the input signal has an amplitude which matches the A/D converter aperture. The gain PGA1 is a negative gain introduced in the local receiver to compensate for the PGA2 gain introduced at the remote emitter.

Then, the gain of the echo path is equal to the product:

$$(\text{gain of } H) \cdot PGA1 \cdot PGA2 \qquad (15)$$

and, $$\begin{aligned}THRESHOLD &= ALPHA \, HR \\ &= ALPHA \cdot (HR/GE) \cdot GE \\ &= BETA \cdot GE\end{aligned} \qquad (16)$$

with:

$$GE = \sum_{i=1}^{p} G(i)^2$$

in which G(i) is updated by the gradient method.

If HR is proportional to GE, BETA is a constant value computed at the initialization, and THRESHOLD is proportional to GE. One can note that the computational complexity of the process of this invention is negligible when compared to the voice coding per se. The proposed process, thus provides for the elimination of the residual echo produced by the approximation of the hybrid impulse response by a shortened filter associated to a flat delay. The residual echo is eliminated with a fairly good precision without cutting any packet of the far-end speaker.

In summary, the proposed process allows complete elimination of the residual echo due to an echo canceler without any audible clipping and also prevents the digital network from being congested by echo packets. It also permits complete elimination of the echo without using a large number of taps for G (2 ms of impulse response is sufficient in practice), which substantially reduces the processing workload. It should be noted that, although the process of this invention was more particularly described as it applies to a specific situation in which the echo replica was generated by a FIR filter associated with a flat delay, the process also applies to improve any kind of echo canceler, when residual echoes (including secondary echoes) are concerned. For instance it also applies to remove residual echoes due to quantizing noise due to the digitizing of the filter coefficients with a limited number of bits.

I claim:

1. In a telephone communication network which includes two wire bidirectional links between each of the telephone sets in the network and a four wire link, which is coupled to the individual two-wire links by hybrid transformers and further including at each end of the four wire link proximate the hybrid transformers an echo canceller including a finite impulse response filter connected between two pairs comprising the four-wire link to cancel echo signals propagating through the hybrid transformer from one pair of the four-wire link to the other pair, a process for each echo canceller for suppressing residual echo signals not cancelled by the echo canceller, in the absence of speech signals from a near end telephone set connected to the two-wire link connected to the proximate hybrid transformer comprising the steps of:

measuring the signal energy (Eout) present in the said one pair in the four-wire link;

measuring the signal energy (Ein) in the said other pair in the four wire link after the signal has been subjected to cancellation by the echo canceller;

comparing the ratio Ein/Eout of said measured energies to a threshold value which is derived from the echo impulse response; and stopping the transmission of the signals in the said other pair of the four-wire link when the ratio bears a predetermined relation to the said threshold value.

2. A method according to claim 1 in which in at least one of the echo cancellers the threshold value is derived from a portion of the echo impulse response not utilized for cancellation.

3. A method according to claim 1 or 2 in which in at least one of the echo cancellers the signal in the said one pair is delayed prior to the energy measurement.

4. An echo canceller and suppressor for use in a voice transmission system for interconnecting first and second telephone sets, said voice transmission system including a first two-wire transmission link connected to the first telephone, a second two wire transmission link connected to the second telephone, a four wire transmission link having a first and second pair of unidirectional links each for transporting voice signals in opposite directions and a first and second hybrid transformer for connecting said first and second two-wire transmission links respectively, to said four wire transmission link said canceller and suppressor comprising:

first and second canceller and suppressor means located in close proximity to said first and second hybrid transformers, respectively, each said canceller and suppressor means including:

a flat delay means for providing delayed signals connected to the unidirectional pair for transporting voice signals originating at the telephone set connected to the two-wire link connected to the remote hybrid transformer;

echo canceller means connected to the said flat delay means and to the unidirectional pair for transporting voice signals originating at the telephone set connected to the two-wire link connected to the hybrid transformer in close proximity for generating and subtracting an echo replica of a voice signal received from the said delay line from the signal received from the hybrid transformer in close proximity to provide an echo cancelled signal for further transmission;

first energy measuring means responsive to the delayed signals provided by the flat delay means for measuring the energy of the delayed signals;

second energy measuring means responsive to the said echo cancelled signal for measuring the energy of the echo cancelled signal; and means responsive to the first and second energy measuring means for controlling transmission of the echo cancelled signal as a function of the energy measurements.

* * * * *